United States Patent
Katou et al.

(10) Patent No.: US 11,500,264 B2
(45) Date of Patent: Nov. 15, 2022

(54) OPTICAL WAVEGUIDE DEVICE WITH REINFORCEMENT MEMBER FOR OPTICAL FIBER AND WAVEGUIDE PORTION

(71) Applicant: Sumitomo Osaka Cement Co., Ltd., Tokyo (JP)

(72) Inventors: Kei Katou, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/399,625

(22) Filed: Aug. 11, 2021

(65) Prior Publication Data

US 2021/0373408 A1 Dec. 2, 2021

Related U.S. Application Data

(63) Continuation of application No. 16/520,327, filed on Jul. 23, 2019, now abandoned.

(30) Foreign Application Priority Data

Jul. 24, 2018 (JP) .................................. 2018-138188

(51) Int. Cl.
*G02F 1/225* (2006.01)
*G02F 1/00* (2006.01)
(Continued)

(52) U.S. Cl.
CPC ............ *G02F 1/225* (2013.01); *G02F 1/0018* (2013.01); *G02F 1/3137* (2013.01); *G02F 1/212* (2021.01);
(Continued)

(58) Field of Classification Search
CPC ...... G02F 1/225; G02F 1/0018; G02F 1/3137; G02F 1/212; G02F 2201/06; G02F 2201/18; G02F 2202/10; G02B 6/10; G02B 6/14
See application file for complete search history.

(56) References Cited

U.S. PATENT DOCUMENTS 5,127,081 A * 6/1992 Koren .................... G02B 6/125
385/14
7,294,292 B2 * 11/2007 Akutsu ............... B29C 33/3857
264/1.24
(Continued)

FOREIGN PATENT DOCUMENTS

JP   1990-126205 A   5/1990
JP   1996-15538 A    1/1996
(Continued)

*Primary Examiner* — Andrew Jordan
(74) *Attorney, Agent, or Firm* — IpHorgan Ltd.

(57) ABSTRACT

An optical waveguide device includes a substrate on which an optical waveguide is formed, and an object that is disposed on the substrate. The optical waveguide includes a mode conversion/branching portion that converts a mode of a light wave propagating through the optical waveguide and branches the light wave, and the object is disposed to cover a part or the whole of the mode conversion/branching portion or not to cover the mode conversion/branching portion when the substrate is viewed in a plan view. In a case where the object is disposed to cover a part of the mode conversion/branching portion, the object is disposed not to consecutively cover a section over a length of a predetermined value or higher in an advancing direction of a light wave.

6 Claims, 4 Drawing Sheets

(51) Int. Cl.
*G02F 1/313* (2006.01)
*G02F 1/21* (2006.01)

(52) U.S. Cl.
CPC ...... *G02F 2201/06* (2013.01); *G02F 2201/18* (2013.01); *G02F 2202/10* (2013.01)

(56) References Cited

U.S. PATENT DOCUMENTS

| | | | | |
|---|---|---|---|---|
| 7,409,114 B2 * | 8/2008 | Kondou | ............... | G02F 1/225 385/11 |
| 8,909,001 B2 * | 12/2014 | Miyazaki | ............... | G02F 1/035 385/2 |
| 8,983,239 B2 * | 3/2015 | Ichioka | ............... | G02F 1/3137 385/16 |
| 9,335,472 B2 * | 5/2016 | Oka | ............... | G02B 6/126 |
| 10,359,653 B2 * | 7/2019 | Kondou | ............... | G02B 6/122 |
| 10,502,988 B2 * | 12/2019 | Itou | ............... | G02F 1/035 |
| 10,578,893 B2 * | 3/2020 | Hosokawa | ............... | G02B 6/12 |
| 10,845,539 B2 * | 11/2020 | Kato | ............... | G02F 1/035 |
| 2005/0271313 A1 * | 12/2005 | Oikawa | ............... | G02F 1/035 385/3 |
| 2007/0076999 A1 * | 4/2007 | Miyazaki | ............... | G02B 6/30 359/315 |
| 2008/0226215 A1 * | 9/2008 | Aoki | ............... | G02F 1/225 385/2 |
| 2009/0067770 A1 * | 3/2009 | Gilardi | ............... | G02F 1/035 385/2 |
| 2009/0324156 A1 * | 12/2009 | Kinpara | ............... | G02F 1/0356 385/2 |
| 2010/0232736 A1 * | 9/2010 | Ichikawa | ............... | G02F 1/0356 385/2 |
| 2012/0087616 A1 | 4/2012 | Ichioka et al. | | |
| 2015/0104128 A1 * | 4/2015 | Oka | ............... | G02B 6/126 385/11 |
| 2016/0011487 A1 * | 1/2016 | Sugiyama | ............... | G02F 1/0121 385/3 |
| 2016/0011488 A1 * | 1/2016 | Sugiyama | ............... | G02F 1/225 385/3 |
| 2017/0176685 A1 * | 6/2017 | Ishihara | ............... | G02B 6/305 |
| 2018/0164612 A1 * | 6/2018 | Kondou | ............... | G02F 1/2257 |
| 2019/0113779 A1 * | 4/2019 | Itou | ............... | G02F 1/035 |
| 2019/0271809 A1 * | 9/2019 | Kato | ............... | G02F 1/225 |
| 2019/0302493 A1 * | 10/2019 | Hosokawa | ............... | G02B 6/12 |
| 2019/0384135 A1 * | 12/2019 | Takahashi | ............... | G02F 1/2257 |
| 2020/0033692 A1 * | 1/2020 | Katou | ............... | G02F 1/225 |
| 2021/0302674 A1 * | 9/2021 | Miyazaki | ............... | G02B 6/125 |
| 2021/0302764 A1 * | 9/2021 | Takano | ............... | G02B 6/1228 |
| 2021/0373408 A1 * | 12/2021 | Katou | ............... | G02F 1/0018 |

FOREIGN PATENT DOCUMENTS

| | | |
|---|---|---|
| JP | 1996-62555 A | 3/1996 |
| JP | 2012-78376 A | 4/2012 |
| JP | 2016-191820 | 11/2016 |

* cited by examiner

OPTICAL WAVEGUIDE DEVICE WITH REINFORCEMENT MEMBER FOR OPTICAL FIBER AND WAVEGUIDE PORTION

BACKGROUND OF THE INVENTION

Field of the Invention

The present invention relates to a substrate provided with an optical waveguide and an optical waveguide device having an object disposed on the substrate.

Description of Related Art

Figure 1:
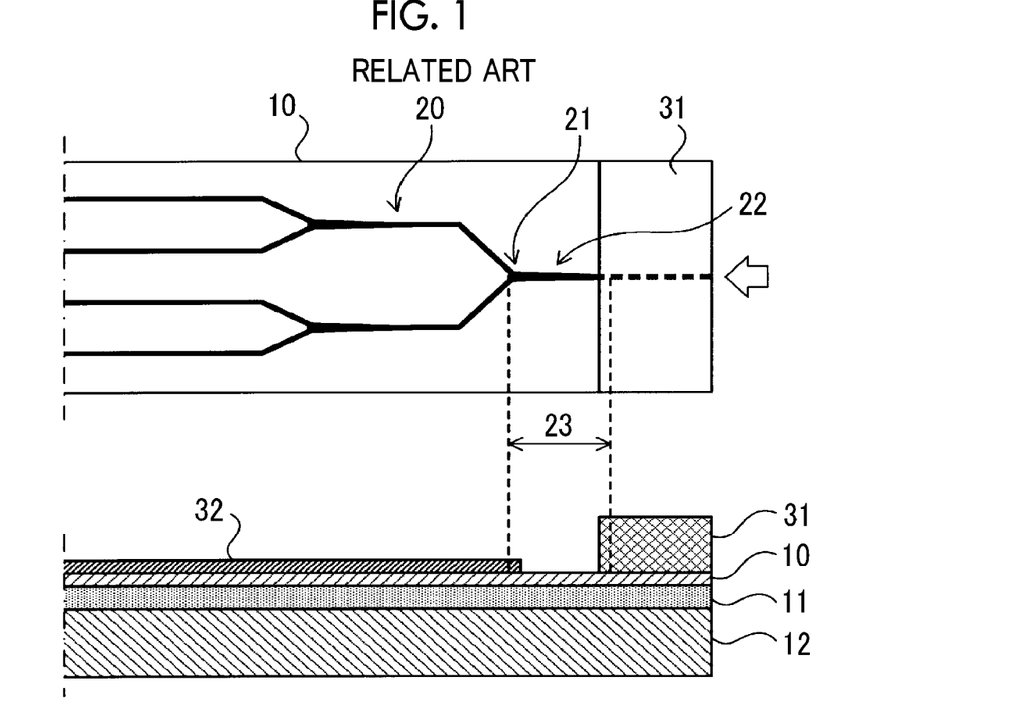
FIG. 1 is a diagram illustrating a structure of an optical waveguide device built into an optical modulator of the related art.

In an optical communication field, an optical modulator that performs optical modulation corresponding to transmission data on an input light wave, and outputs the light wave. FIG. 1 illustrates a structure of an optical waveguide device built into an optical modulator of the related art. An upper part of FIG. 1 is a plan view of a part of the optical waveguide device (a portion corresponding to a light wave input side), and a lower part thereof is a sectional view of the part.

The optical waveguide device is configured by forming an optical waveguide 20 including a Mach-Zehnder type waveguide used to perform optical modulation on a front surface side of a substrate 10 having an electro-optic effect. The optical waveguide 20 may be a nest type waveguide in which a plurality of Mach-Zehnder type waveguides are incorporated in a nesting shape. In FIG. 1, the substrate 10 employs a considerably thin substrate (that is, a thin plate), and the optical waveguide device has a multilayer structure to be reinforced by adhering a reinforcing substrate 12 thereto via an adhesive 11. The optical waveguide device is not limited to such a multilayer structure, and may have a single-layer structure using a substrate with a sufficient thickness.

In order to dispose the plurality of Mach-Zehnder type waveguides in parallel, the optical waveguide 20 has a plurality of Y-branch waveguide sections 21 that distribute a light wave propagating through the optical waveguide into branches an equal power ratio. A mode conversion section 22 that converts a light wave mode before a light wave is branched is disposed on an upstream side of each Y-branch waveguide section 21 in a light wave advancing direction. The mode conversion section 22 has, for example, a structure (tapered structure) in which a width of the optical waveguide is gradually increased such that a single optical waveguide is branched into two optical waveguides.

The substrate 10 is connected to an optical fiber (not illustrated) for light input, and a connection portion between the substrate 10 and the optical fiber is reinforced by disposing a reinforcing member 31 on the front surface of the substrate 10. A control electrode 32 controlling a light wave propagating through the optical waveguide 20 is also disposed on the front surface of the substrate 10. The control electrode 32, there is a modulation electrode to which a high-frequency signal (modulation signal) is applied, a ground electrode surrounding the modulation electrode, or a bias control electrode to which a DC voltage (bias voltage) is applied.

A material such as lithium niobate (LN) used for the substrate 10 has an excellent piezoelectric effect, and, thus, in a case where the substrate 10 receives external force or stress occurs in the substrate 10, a refractive index of the corresponding portion changes. An object (disposed object) such as the reinforcing member 31 or the control electrode 32 disposed on the front surface of the substrate 10 is subjected to heat shrinkage due to a temperature change, but the degree of heat shrinkage differs since linear expansion coefficients or Young's moduli thereof are different from each other. Thus, stress corresponding to a heat shrinkage difference occurs in each object, and, as a result, a refractive index of the substrate 10 changes due to the stress of each object. Particularly, a stress change is likely to increase at an end part (boundary portion) of an object disposition region, and this causes a refractive index distribution to occur in the substrate 10. The thermal stress of each object may be calculated as follows (Equation 1).

$$\text{Thermal stress} E[\text{Pa}] = \text{linear expansion coefficient}[/K] \times \text{temperature change}[K] \times \text{Young's modulus}[\text{Pa}] \quad \text{(Equation 1)}$$

In a case where a refractive index in a region of the Y-branch waveguide section 21 or the mode conversion section 22 disposed in front thereof changes, and thus a refractive index distribution occurs, a branch ratio (power ratio) of propagating light in the Y-branch waveguide section 21 is not equal. As illustrated in FIG. 1, in the related art, the end part of the disposition region of an object such as the reinforcing member 31 or the control electrode 32 is located to be disposed in the region of a mode conversion/branching portion 23 including the Y-branch waveguide section 21 and the mode conversion section 22.

In such a disposition, a refractive index distribution occurs due to a stress change in the region of the mode conversion/branching portion 23, and thus a difference in a branch ratio of propagating light in the Y-branch waveguide section 21 occurs. As a result, deterioration in an On/Off extinction ratio in each Mach-Zehnder type waveguide or a loss difference between branched waveguide sections (Mach-Zehnder type waveguide arm sections) occurs, and thus there is a problem in that transmission characteristics deteriorate. In a case where external force is applied to an LN substrate or the like with an excellent piezoelectric effect, polarization that is proportional to pressure also occurs, and thus a refractive index of a portion to which the pressure is applied more considerably changes.

The problem becomes more easily apparent in a case of a multilayer structure in which substrates of different kinds of materials with greatly different linear expansion coefficients or Young's moduli are stuck to each other, particularly, a structure in which an LN thin plate is reinforced with a reinforcing substrate. This is because stress caused by heat shrinkage tends to occur in the thin plate where the optical waveguide is located. The problem may occur in a single-layer structure using a substrate with a sufficient thickness, and thus it is expected to further improve transmission characteristics by considering countermeasures therefor.

Various examinations have been performed hitherto with respect to a structure for stabilizing a branch ratio in a Y-branch structure. For example, Japanese Laid-open Patent Publication No. 2016-191820 discloses a structure in which a three-branched structure or a slab waveguide is disposed in a preceding stage of a Y-branch structure.

SUMMARY OF THE INVENTION

An object of the present invention is to solve the problem and thus to provide an optical waveguide device capable of suppressing deterioration in transmission characteristics caused by heat shrinkage of an object disposed on a substrate.

In order to achieve the object, an optical waveguide device of the present invention has the following technical features.

(1) An optical waveguide device includes a substrate on which an optical waveguide is formed; and an object that is disposed on the substrate, in which the optical waveguide includes a portion (hereinafter referred as "mode conversion/branching portion") that converts a mode of a light wave propagating through the optical waveguide and branches the light wave, in which the object is disposed to cover a part or the whole of the mode conversion/branching portion or not to cover the mode conversion/branching portion at all when the substrate is viewed in a plan view, and in which, in a case where the object is disposed to cover a part of the mode conversion/branching portion, the object is disposed not to consecutively cover a section over a length of a predetermined value or higher in an advancing direction of a light wave.

(2) In the optical waveguide device according to (1), the predetermined value is 40 μm, and, in a case where the object is disposed to cover a plurality of discontinuous sections, a clearance of 20 μm or higher is provided between the sections.

(3) In the optical waveguide device according to (1) or (2), the object is an electrode controlling a light wave propagating through the optical waveguide, or a reinforcing member reinforcing connection between an optical fiber through which a light wave is input to the optical waveguide and the substrate.

(4) In the optical waveguide device according to any one of (1) to (3), the substrate is a thin plate with a thickness of 20 μm or lower, and is reinforced with a reinforcing substrate adhered to the substrate.

In the present invention, since an object on a substrate is disposed to cover a part or the whole of a mode conversion/branching portion, or not to cover the mode conversion/branching portion, it is possible to suppress deterioration in transmission characteristics due to heat shrinkage of the object on the substrate.

DETAILED DESCRIPTION OF THE INVENTION

An optical waveguide device according to the present invention will be described in detail by using preferable examples. The present invention is not limited to the embodiments described below.

As illustrated in FIG. 2 to FIG. 7A, FIG. 7B and FIG. 7C, in an optical waveguide device according to the present invention including a substrate (10) provided with an optical waveguide (20) and an object (31, 32) disposed on the substrate, the optical waveguide includes a mode conversion/branching portion (23, 24) that converts a mode of a light wave propagating through the optical waveguide and branches the light wave, and the object is disposed to cover a part or the whole of the mode conversion/branching portion, or not to cover the mode conversion/branching portion when the substrate is viewed in a plan view. In a case where the object is disposed to cover a part of the mode conversion/branching portion, the object is disposed not to consecutively cover a section over a length of a predetermined value or higher in an advancing direction of a light wave.

As mentioned above, the object (disposed object) on the substrate is disposed to cover a part or the whole of the mode conversion/branching portion, or not to cover the mode conversion/branching portion, and thus a refractive index distribution due to a stress change caused by heat shrinkage of the object on the substrate hardly occurs in a region of the mode conversion/branching portion. Therefore, it is possible to suppress the occurrence of a difference in a branch ratio of propagating light due to heat shrinkage of the object on the substrate. As a result, it is possible to reduce deterioration in an On/Off extinction ratio in each Mach-Zehnder type waveguide or a loss difference between branched waveguide sections, and thus to suppress deterioration in transmission characteristics. The present invention is considerably useful for an optical modulator using a substrate such as an LN substrate with an excellent piezoelectric effect, but the present invention is also effective to an optical modulator using other substrates (a glass substrate or a crystalline substrate) in which a refractive index changes when pressure is applied thereto.

The mode conversion/branching portion includes, for example, a mode conversion section (22) that converts a mode of a light wave and a Y-branch waveguide section (21) that branches the light wave subjected to the mode conversion. In a case where there is a section where a waveguide width changes right after the Y-branch waveguide section, the section may also be included in the mode conversion/branching portion. In other words, the mode conversion/branching portion according to the present invention is configured with the Y-branch waveguide section and sections in which a mode of a light wave changes (sections in which a mode is unstable) before and after the Y-branch waveguide section. In a case where a refractive index changes in the mode conversion/branching portion, a central position of a distribution of a light wave propagating through an optical waveguide is deviated, distributions are asymmetric to each other, or the light wave couples to modes other than a desired mode, and thus a distribution of the light wave propagating through the optical waveguide becomes unstable. Therefore, the present invention is directed to suppressing a refractive index change in a mode conversion/ branching portion and thus to remove unstableness of a distribution of a light wave propagating through the optical waveguide, by examining disposition of an object on a substrate.

Figure 7A:
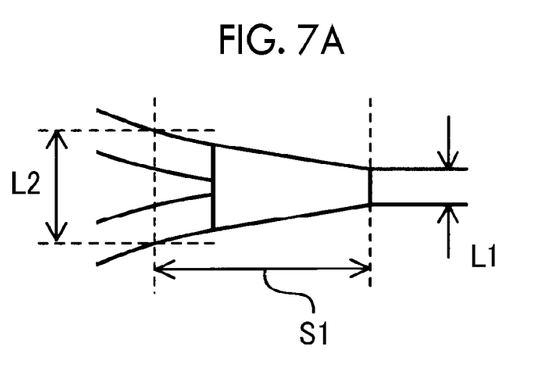
FIG. 7A is a diagram illustrating an example of a structure of a mode conversion/branching portion.
Figure 7B:
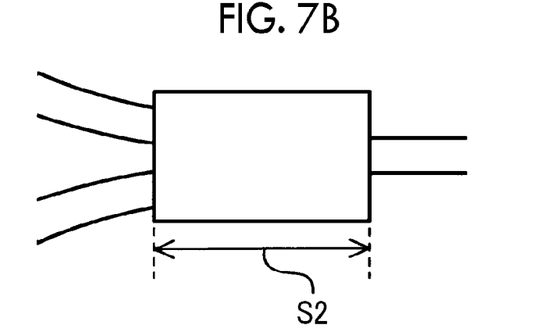
FIG. 7B is a diagram illustrating an example of a structure of a mode conversion/branching portion.
Figure 7C:
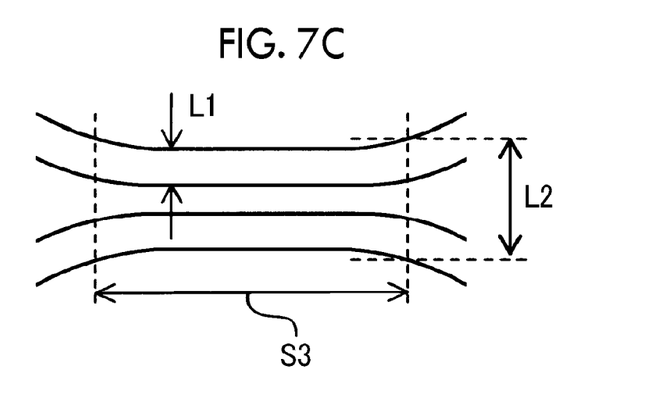
FIG. 7C is a diagram illustrating an example of a structure of a mode conversion/branching portion.

The mode conversion/branching portion may be realized in various structures as several examples are illustrated in FIG. 7A, FIG. 7B, and FIG. 7C.

FIG. 7A illustrates an example of a mode conversion/branching portion using a Y-branch structure, and the mode conversion/branching portion has a shape (tapered shape) of which a width gradually increases toward a branching part. In a case of such a structure, a section S1 in which a total width L2 of two branched optical waveguide parts is three times or lower (L2≤L1×3) the width L1 (a width of a portion not having the tapered shape) of a normal optical waveguide corresponds to the mode conversion/branching portion.

FIG. 7B illustrates an example of a mode conversion/branching portion using a multimode interferometer (MMI), and the mode conversion/branching portion has a shape in which a predetermined section in front of a branching part is expanded to a width that allows multimode waveguiding. In a case of such a structure, a section S2 with an expanded width corresponds to the mode conversion/branching portion.

FIG. 7C illustrates an example of a mode conversion/branching portion using a directional coupler, and two optical waveguides are close to each other over a predetermined section. In a case of such a structure, in the same manner as in the case of the Y-branch structure, a section S3 in which a total width L2 of a portion where the two optical waveguides are close to each other is three times or lower (L2≤L1×3) the width L1 of a normal optical waveguide corresponds to the mode conversion/branching portion.

The condition "L2≤L1×3" is one of condition examples suitable to be applied to the present invention, and is not intended to be limited to this condition.

Hereinafter, a specific configuration of an optical modulator according to the present invention will be described by using Examples.

FIGS. 2 to 5 respectively illustrate structures of optical waveguide devices related to Example 1 to Example 4. An upper part of each drawing is a plan view of a part (a portion corresponding to a light wave input side) of the optical waveguide device, and a lower part thereof is a sectional view of the part. A fundamental structure of an optical modulator related to each Example is the same as that of the related art described with reference to FIG. 1.

Example 1

Figure 2:
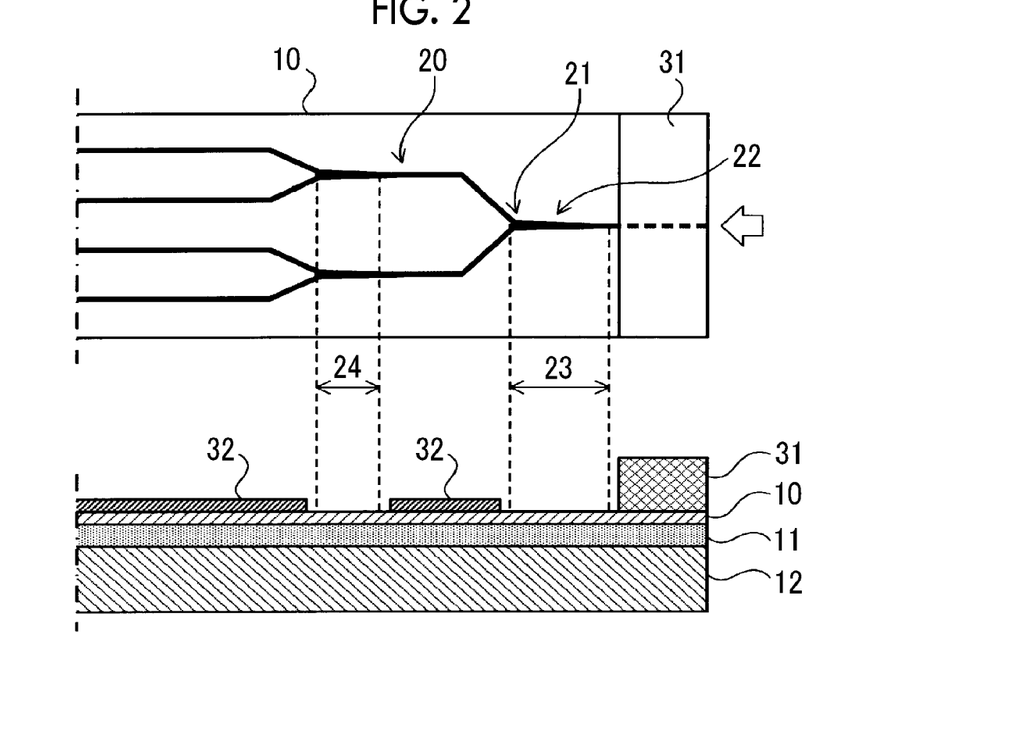
FIG. 2 is a diagram illustrating a structure of an optical waveguide device according to Example 1 of the present invention.

As illustrated in FIG. 2, the optical waveguide device related to Example 1 employs a considerably thin substrate (that is, a thin plate) as a substrate 10, and has a multilayer structure to be reinforced by adhering a reinforcing substrate 12 thereto via an adhesive 11. The substrate 10 is made of a material such as lithium niobate (LN) having an excellent piezoelectric effect. A thickness of the substrate 10 is about 20 μm, a thickness of the adhesive 11 is about 20 μm to 100 μm, and a thickness of the reinforcing substrate 12 is about 400 μm to 1000 μm.

An optical waveguide 20 formed on the substrate 10 includes mode conversion/branching portions 23 and 24 that convert a mode of a light wave propagating through the optical waveguide and branch the light wave. The mode conversion/branching portion 23 is a mode conversion/branching portion located on the most upstream side in a light wave advancing direction, and the mode conversion/branching portion 24 is the second mode conversion/branching portion from the upstream side in the light wave advancing direction. There may be a structure in which a mode conversion/branching portion is further provided on a downstream side of the mode conversion/branching portions 23 and 24.

A reinforcing member 31 reinforcing connection between an optical fiber (not illustrated) through which a light wave is input to the optical waveguide 20 and the substrate 10, and a control electrode 32 controlling a light wave propagating through the optical waveguide 20 are disposed on a front surface of the substrate 10. Such an object is greatly different from the substrate 10 in terms of a thermal expansion coefficient or a Young's modulus, causes stress in the substrate 10 to occur due to heat shrinkage, and thus changes a refractive index of the optical waveguide 20.

In Example 1, as illustrated in the sectional view on the lower part of FIG. 2, the reinforcing member 31 is disposed on the upstream side of the mode conversion/branching portion 23, and the control electrode 32 is disposed between the mode conversion/branching portion 23 and the mode conversion/branching portion 24, and on the downstream side of the mode conversion/branching portion 24. In other words, the reinforcing member 31 and the control electrode 32 are disposed not to cover the mode conversion/branching portions 23 and 24.

According to the structure, a refractive index distribution due to stress caused by heat shrinkage of objects (the reinforcing member 31 and the control electrode 32) on the substrate 10 hardly occurs in the regions of the mode conversion/branching portions 23 and 24. Therefore, since a branch ratio of propagating light is stabilized when a light wave is branched, and thus deterioration in an On/Off extinction ratio in each Mach-Zehnder type waveguide or a loss difference between branched waveguide sections can be reduced, it is possible to suppress deterioration in transmission characteristics.

Disposing an object not to cover the mode conversion/branching portion does not indicate that the object is not present in the entire region of the substrate in a width direction (a direction orthogonal to a propagation direction of a light wave) of the substrate. In other words, even though a position of the substrate in the longitudinal direction (the propagating direction of a light wave) of the substrate is a region overlapping the mode conversion/branching portion, in a case where a position of the substrate in the width direction is a region that is different from a region of the mode conversion/branching portion, an object may be present.

Example 2

Figure 3:
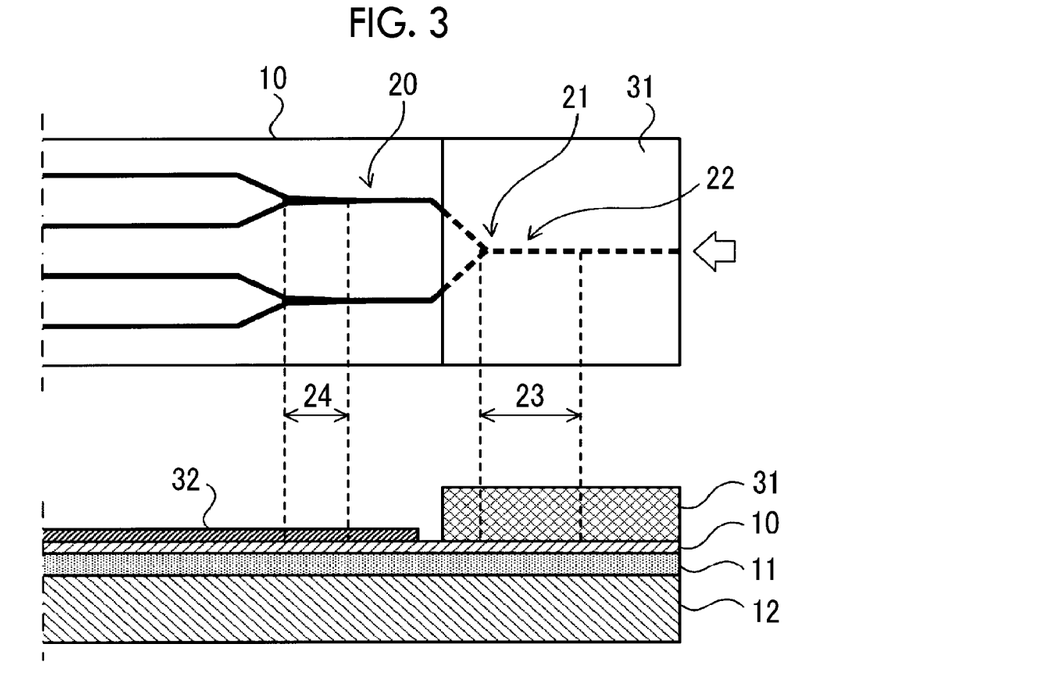
FIG. 3 is a diagram illustrating a structure of an optical waveguide device according to Example 2 of the present invention.

In Example 2, as illustrated in a sectional view of a lower part of FIG. 3, the reinforcing member 31 is disposed to cover the whole mode conversion/branching portion 23. The control electrode 32 is disposed to cover the whole mode conversion/branching portion 24.

According to the structure, a refractive index distribution due to stress caused by heat shrinkage of objects on the substrate 10 also hardly occurs in the regions of the mode conversion/branching portions 23 and 24. As a result, since a branch ratio of propagating light of when a light wave is branched is stabilized, it is possible to suppress deterioration in transmission characteristics.

Disposing an object to cover the whole mode conversion/branching portion does not indicate that the object is present in the entire region of the substrate in the width direction of the substrate. In other words, even though a position of the substrate in the longitudinal direction of the substrate is a region overlapping the mode conversion/branching portion, in a case where a position of the substrate in the width direction is a region that is different from a region of the mode conversion/branching portion, an object may not be present.

Example 3 and Example 4

Figure 4:
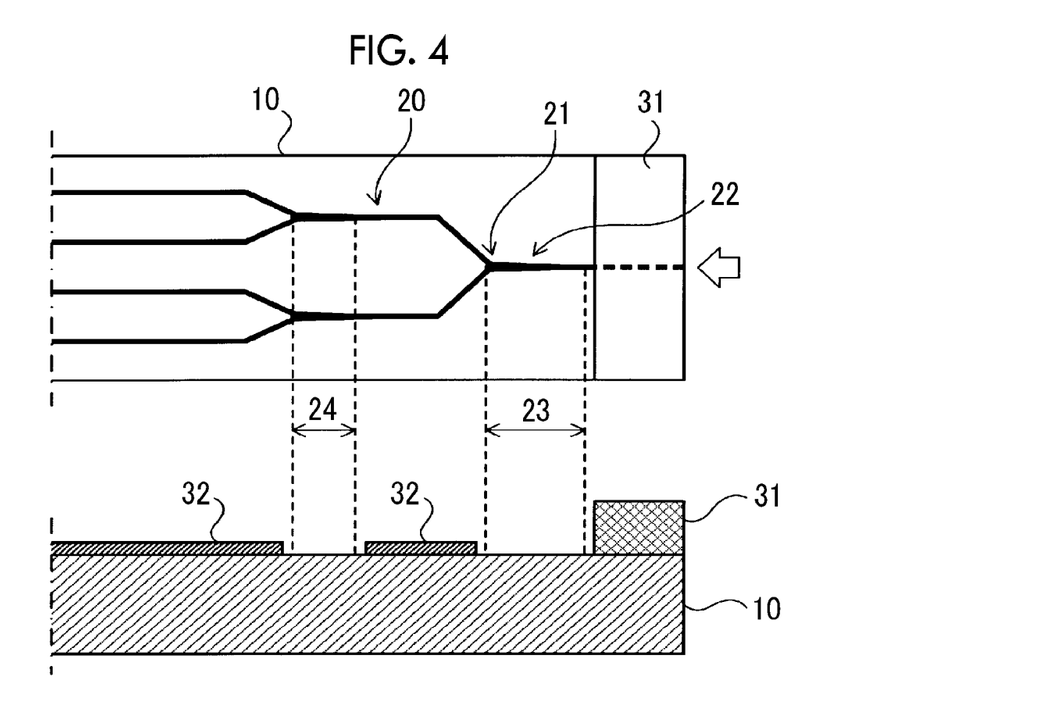
FIG. 4 is a diagram illustrating a structure of an optical waveguide device according to Example 3 of the present invention.
Figure 5:
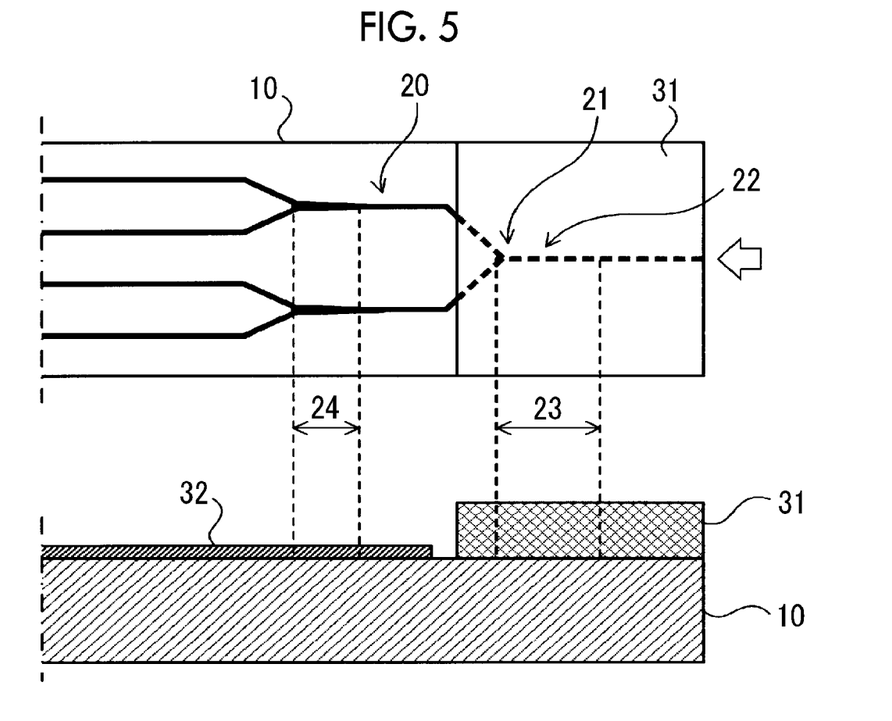
FIG. 5 is a diagram illustrating a structure of an optical waveguide device according to Example 4 of the present invention.

Example 3 illustrated in FIG. 4 is a modification example of Example 1 illustrated in FIG. 2. Example 4 illustrated in FIG. 5 is a modification example of Example 2 illustrated in FIG. 3. The optical waveguide devices of Example 1 and Example 2 have a multilayer structure, and are reinforced by adhering the reinforcing substrate 12 to a back surface of the substrate 10 formed to be considerably thin, but optical waveguide devices of Example 3 and Example 4 have a single-layer structure, and the substrate 10 is formed to be thick to the extent to which sufficient strength is obtained.

Even in a case where the optical waveguide device has a single-layer structure, a refractive index distribution may occur due to stress caused by heat shrinkage of an object on the substrate 10. Therefore, as illustrated in FIGS. 4 and 5, a branch ratio of propagating light of when a light wave is branched is stabilized through examination of disposition of an object on the substrate 10, and thus it is possible to further improve transmission characteristics.

Here, in each of the Examples, each object on the substrate is disposed to cover the whole mode conversion/branching portion or disposed not to cover the mode conversion/branching portion, but may be disposed to cover a part of the mode conversion/branching portion. However, it is necessary to dispose an object not to consecutively cover a section over a length of a predetermined value or higher in the advancing direction of a light wave. Specific conditions will be described with reference to FIG. 6. Herein, it is supposed that a light wave of a wavelength region in a C-Band (1530 nm to 1565 nm) or an L-Band (1565 nm to 1625 nm) that is a general communication band is used.

Figure 6:
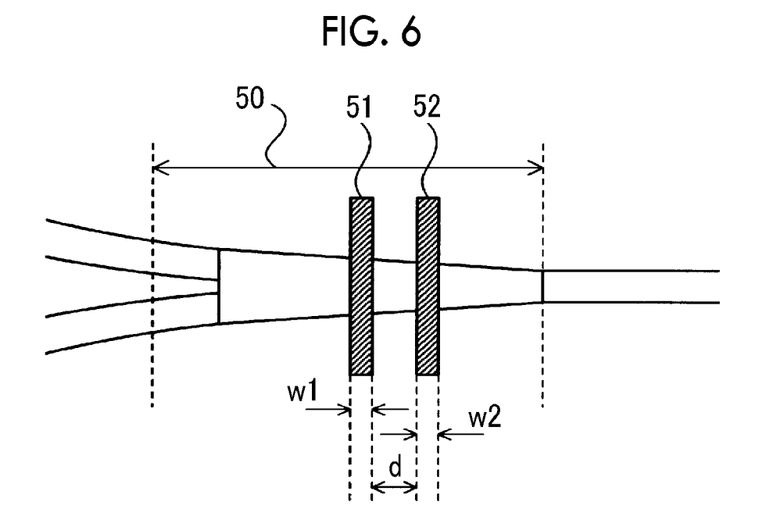
FIG. 6 is a diagram illustrating an example in which an electrode is disposed to cover a part of a mode conversion/branching portion.

In FIG. 6, two control electrodes 51 and 52 are disposed to cover a part of a mode conversion/branching portion 50. In this case, respective widths w1 and w2 of the control electrodes 51 and 52 are all preferably 40 μm or lower. As mentioned above, in a case where the object is disposed to cover a part of the mode conversion/branching portion, the object is required to be disposed not to consecutively cover a section of 40 μm or higher in the advancing direction of a light wave. This is because, in a case where the object is required to be disposed to consecutively cover a section of 40 μm or higher in the advancing direction of a light wave, an optical loss difference (branch ratio difference) sufficient to influence performance of an optical modulator occurs.

A clearance d between the control electrode 51 and the control electrode 52 is preferably 20 μm or higher. As mentioned above, in a case where an object is disposed to cover a plurality of discontinuous sections, it is necessary to provide a clearance of 20 μm or higher between the sections. This is because, in a case where a clearance between the objects provided in a region of the mode conversion/branching portion is sufficiently wide, the influence of a stress change is small, but, in a case where the clearance is narrowed to 20 μm or lower, a stress change is continuously viewed, and thus an optical loss difference (branch ratio difference) sufficient to influence performance of an optical modulator occurs.

The conditions (the widths w1 and w2 and the clearance d) are preferable examples in a case where an object is disposed not to consecutively cover a section over a length of a predetermined value or higher in an advancing direction of a light wave when the object is disposed to cover a part of a mode conversion/branching portion. In other words, the conditions may be mitigated to the extent to which the influence on performance of an optical modulator is ignorable (that is, the extent of being practically effective).

In the description hitherto, the examination for suppressing the occurrence of a stress change due to heat shrinkage of an object on a substrate in regions of the first and second mode conversion/branching portions from the upstream side in the light wave advancing direction has been described, but may also be applied to a mode conversion/branching portion located downstream. However, the present invention is preferably sequentially applied to mode conversion/branching portions on the upstream side in which a light wave propagating through an optical waveguide has higher power since a more excellent effect can be achieved. Ina case where the present invention is applied to a plurality of mode conversion/branching portions, objects are not required to be disposed in the same manner in all of the mode conversion/branching portions, a certain mode conversion/branching portion may be covered with an object, and another mode conversion/branching portion may not be covered with an object. Ina case where the present invention is applied to a mode conversion/branching portion on the downstream side, a control electrode is formed through patterning or is not formed, and thus an existing manufacturing process can be used.

As mentioned above, the present invention has been described based on Examples, but the present invention is not limited to the above-described contents, and design changes may occur as appropriate within the scope without departing from the concept of the present invention. For example, in FIGS. 2 and 3, a reinforcing substrate is stuck to a thin plate via an adhesive, and thus a multilayer structure substrate is obtained, but a multilayer structure substrate may be formed through crystal growth on a base substrate.

The above description relates to disposition of an object in a mode conversion/branching portion, but, in a case where an optical waveguide device has a mode conversion/combining portion that converts modes of respective light waves propagating through branched waveguide sections and combines the light waves into a single light wave, the same may apply to the mode conversion/combining portion.

In other words, in a case where an optical waveguide formed on a substrate includes a mode conversion/combining portion, preferably, an object is disposed to cover a part or the whole of the mode conversion/combining portion or not to cover the mode conversion/combining portion, when the substrate is viewed in a plan view. In a case where an object is disposed to cover a part of the mode conversion/combining portion, the object is preferably disposed not to consecutively cover a section over a length of a predetermined value or higher in an advancing direction of a light wave.

According to the present invention, it is possible to provide an optical waveguide device capable of suppressing deterioration in transmission characteristics due to heat shrinkage of an object disposed on a substrate.

What is claimed is:
1. An optical waveguide device comprising:
a substrate on which an optical waveguide is formed; and a reinforcing member that is disposed on the substrate to reinforce connection between an optical fiber through which a light wave is input to the optical waveguide and the substrate, wherein the optical waveguide includes a first portion that converts a mode of light wave propagating through the optical waveguide and branches the light wave, and wherein the reinforcing member is disposed to cover the whole of the first portion when the substrate is viewed in a plan view.

2. The optical waveguide device according to claim 1, wherein the optical waveguide includes a second portion that converts a mode of a light wave branched by the first portion and further branches the light wave, and wherein an electrode controlling a light wave propagating through the optical waveguide is disposed not to cover the second portion at all when the substrate is viewed in a plan view.

3. The optical waveguide device according to claim 1, wherein the optical waveguide includes a second portion that converts a mode of a light wave branched by the first portion and further branches the light wave, and wherein an electrode controlling a light wave propagating through the optical waveguide is disposed to cover the whole of the second portion when the substrate is viewed in a plan view.

4. The optical waveguide device according to claim 1, wherein the first portion has a mode conversion part and a branching part wherein the optical waveguide is split into two branched waveguides, and the mode conversion part has a tapered shape of which a width of the optical waveguide gradually increases toward the branching part.

5. The optical waveguide device according to claim 4, wherein the width of an end of the branching part comprising the two branched waveguides is three times or less than the width of the optical waveguide adjacent to the mode conversion part.

6. The optical waveguide device according to claim 1, wherein the reinforcing member has a different Young's modulus from that of the substrate.

* * * * *